United States Patent [19]

Sprague

[11] 4,389,659
[45] Jun. 21, 1983

[54] ELECTRO-OPTIC LINE PRINTER

[75] Inventor: Robert A. Sprague, Saratoga, Calif.

[73] Assignee: Xerox Corporation, Stamford, Conn.

[21] Appl. No.: 187,911

[22] Filed: Sep. 17, 1980

[51] Int. Cl.³ .................. G01D 15/00; G01D 9/46; G02F 1/01
[52] U.S. Cl. .................. 346/153.1; 346/108; 350/356
[58] Field of Search .................. 346/108, 160, 153.1, 346/107 R; 350/356; 358/300, 302

[56] References Cited

U.S. PATENT DOCUMENTS 3,829,608  7/1974  Pietermaat et al. .................. 358/300
4,281,904  8/1981  Sprague et al. .................. 350/356

OTHER PUBLICATIONS

"Light Gates Give Data Recorder Improved Hardcopy Resolution" *Electronic Design*, Jul. 19, 1979, pp. 31–32.
"Polarizing Filters Plot Analog Waveforms", *Machine Design* vol. 51, No. 17, Jul. 26, 1979 p. 62.
"Data Recorder Eliminates Problem of Linearity" *Design News*, Feb. 4, 1980, pp. 56–57.

*Primary Examiner*—L. T. Hix
*Assistant Examiner*—Thomas H. Tarcza

[57] ABSTRACT

In an electro-optic line printer having a light valve comprising an electro-optic element with a plurality of individually addressable electrodes, sample and hold circuits maintain the data samples for each line of an image on the electrodes for essentially a full line printing time to increase the exposure contrast. A multiplexer may be used to ripple the data samples of a serial data stream onto the electrodes, and the polarity of the data samples applied to the electrodes may be occassionally reversed to prevent optical damage to the electro-optic element. Moreover, a pair of longitudinally displaced and laterally staggered electrode arrays may be used in light valves which rely on fringe fields to avoid electrode aligned blind spots.

20 Claims, 9 Drawing Figures

ELECTRO-OPTIC LINE PRINTER

BACKGROUND OF THE INVENTION

This invention relates to line printers and, more particularly, to electro-optic line printers.

It has been shown that an electro-optic element having a plurality of individually addressable electrodes can be used as a multi-gate light valve for line printing. See, for example, a copending and commonly assigned U.S. patent application of R. A. Sprague et al., which was filed June 21, 1979 under Ser. No. 040,607, now U.S. Pat. No. 4,281,904 on a "TIR Electro-Optic Modulator with Individually Addressed Electrodes." Also see "Light Gates Give Data Recorder Improved Hardcopy Resolution," *Electronic Design,* July 19, 1979, pp. 31-32; "Polarizing Filters Plot Analog Waveforms," *Machine Design,* Vol. 51, No. 17, July 26, 1979, p. 62; and "Data Recorder Eliminates Problem of Linearity," *Design News,* February 4, 1980, pp. 56-57.

Almost any optically transparent electro-optical material can be used as the electro-optic element of such a light valve. As of now the most promising materials appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e. orthogonally relative to its optical axis), typically on equidistantly separated centers so that there is a generally uniform inter-electrode gap spacing.

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheet-like collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recorded medium by central dark field or central bright field imaging optics. Alternatively, if the input light beam is polarized, the polarization modulation to intensity modulation conversion process may be performed by passing the polarization modulated output beam through a polarization analyzer. In more generic terms, the p-modulation of the light beam is converted into a correspondingly modulated intensity profile by using "p-sensitive readout optics" to image or project (hereinafter collectively referred to as imaging) the light beam onto the recording medium.

SUMMARY OF THE INVENTION

One of the potentially troublesome characteristics of electro-optic line printers is that the output power of the light source is effectively divided among the many picture elements required to define a line of the image. If the data samples are short lived, there may be insufficient energy available at one or more picture element positions to adequately expose the recording medium. Hence, in accordance with this invention, there are sample and hold circuits for maintaining the data samples for each line of the image on the electrodes of the light valve for essentially a full line printing time. This gives the data samples an extended period of time to interact with the light beam, thereby increasing the available exposure energy for each picture element of the image. Interestingly, it has been found that the capacitance provided by the electrodes and the electro-optic element may be used as the storage elements for the sample and hold circuits.

As is known, image input information is often supplied as a serial data stream having a predetermined data rate. For that reason, in keeping with one of the more detailed aspects of this invention, there is a multiplexer for rippling the data samples of such a serial input data stream onto the electrodes at a ripple rate which is matched to the data rate.

If an electric field of a given polarity is repeatedly applied to an electro-optic element, the performance of the electro-optic element may degrade as a function of time due to localized concentrations of trapped carriers. To avoid that problem, in accordance with another of the detailed aspects of this invention, the polarity of the data samples applied to the electrodes of the light valve is periodically or aperiodically reversed.

Electro-optic printers having light valves which rely on fringe fields to interact with the light beam tend to have "blind spots" because of the inherent electrode aligned nulls in such fringe fields. In keeping with still another detailed feature of this invention, that problem is avoided by using a light valve which has a pair of longitudinally displaced, laterally staggered electrode arrays to produce essentially identical, laterally staggered fringe field patterns.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
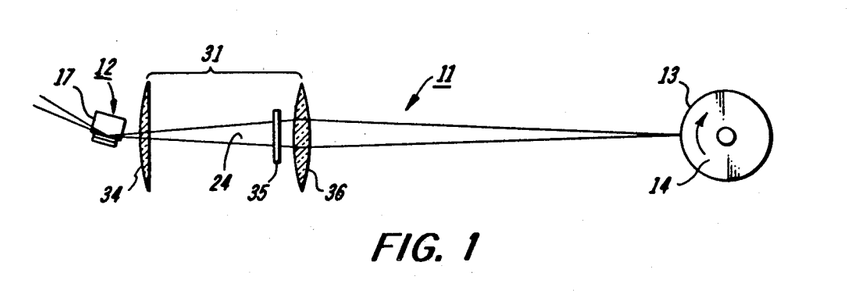
FIG. 1 is a schematic side view of a TIR electro-optic line printer constructed in accordance with this invention.
Figure 2:
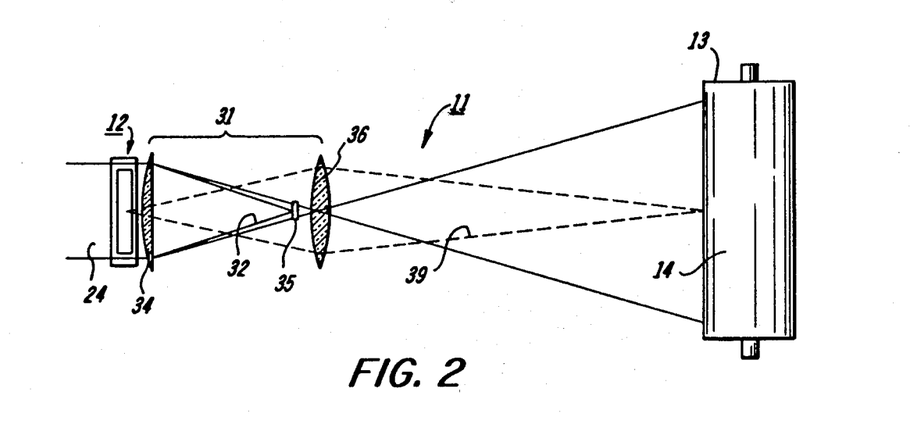
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper which may be supplied as web or cut sheet stock. The recording medium 13 should, therefore, be visualized in the generalized case as being a photosensitive medium which is exposed in an image configuration while advancing in a cross line or line pitch direction relative to the light valve 12.

Figure 3:
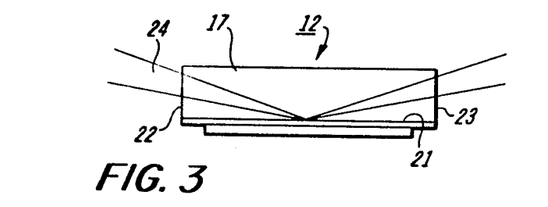
FIG. 3 is an enlarged side view of a TIR light valve for the electro-optic line printer of FIGS. 1 and 2.
Figure 4:
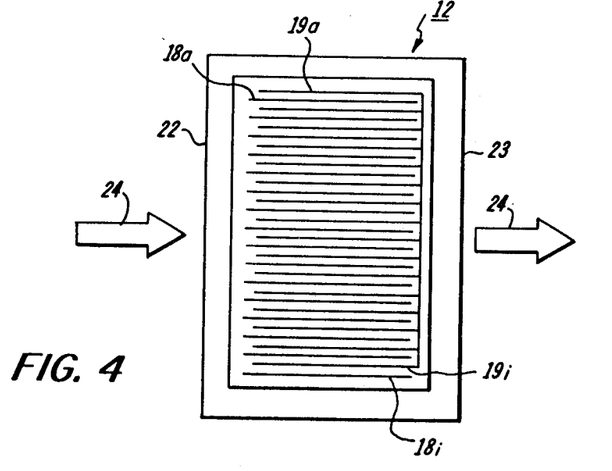
FIG. 4 is an enlarged bottom plan view of the TIR light valve of FIG. 3.
Figure 5:
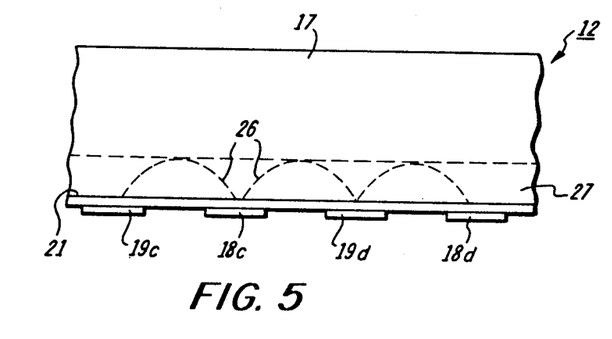
FIG. 5 is a further enlarged and fragmentary schematic end view of the TIR light valve shown in FIG. 3 to better illustrate the interaction between the fringing fields and the light beam.

As best shown in FIGS. 3–5, the light valve 12 includes an electro-optic element 17, a plurality of individually addressable electrodes (18a–18i), and a corresponding plurality of ground plane electrodes (19a–19i). For a total internal reflection (TIR) mode of operation as illustrated, the electro-optic element 17 typically is a y cut crystal of, say, $LiNbO_3$ having a polished reflecting surface 21 which is integral with and disposed between polished input and output faces 22 and 23, respectively. The electrodes (18a–18i) and (19a–19i) are intimately coupled to the electro-optic element 17 adjacent the reflecting surface 21 and are distributed across essentially the full width of the electro-optic element 17 in alternating parallel paired relationship. Typically, the electrodes (18a–18i) and (19a–19i) are approximately 1–30 microns wide and are on centers which are more or less equidistantly separated to provide a generally uniform inter-electrode gap spacing of 1–30 microns. Furthermore, the electrodes (18a–18i) and (19a–19i) are illustrated as extending generally parallel to the optical axis of the electro-optic element 17 so that they each have a projection of substantial length along that axis.

Referring to FIGS. 1–5 for a review of the operation of the line printer 11, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the surface 21 and is totally internally reflected therefrom for subsequent transmission through the output face 23. As will be seen, the light beam 24 illuminates substantially the full width of the electro-optic element 17 and is phase front modulated while passing therethrough in accordance with the data samples applied to the electrode pairs (18a, 19a)–(18i, 19i).

More particularly, to modulate the light beam 24, successive sets of digital or analog data samples which represent respective collections of picture elements for successive lines of the image, are sequentially applied to the individually addressable electrodes (18a–18i). Localized fringe fields 26 are, therefore produced within an interaction region 27 of the the electro-optic element 17 between each electrode (18a–18i), and its corresponding reterence electrode (19a–19i) to which non-reference level data samples are applied. This creates localized variations in the refractive index of the electro-optic element 17 widthwise of the interaction region 27, and such refractive index variations faithfully represent the data samples appearing across the paired electrodes (18a, 19a)–(18i, 19i) at any given point in time. Consequently, the phase front of the light beam 24 is spatially and serially modulated in accordance with the data samples for successive lines of the image as the light beam 24 passes through the interaction region 27 of the electro-optic element 17.

To expose the recording medium 13 in an image configuration, there suitably are Schlieren central dark field imaging optics 31 which are optically aligned between the electro-optic element 17 and the recording medium 13 for imaging the light beam 24 onto the recording medium 13. The imaging optics 31 convert the spatial phase front modulation of the light beam 24 into a correspondingly modulated intensity profile and provide any magnification that is required to obtain an image of a desired width. To accomplish that, the illustrated imaging optics 31 include a field lens 34 for focusing the zero order diffraction components 32 of the phase front modulated light beam 24 onto a central stop 35 and an imaging lens 36 for imaging the scattered higher order diffraction components onto the recording medium 13. The field lens 34 is optically aligned between the electro-optic element 17 and the stop 35 so that substantially all of the zero order components 32 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

As indicated in FIG. 2 by the broken lines 39, each pair of electrodes (18a, 19a)–(18i, 19i) cooperates with the electro-optic element 17 and the p-sensitive readout optics 31 to effectively define a local modulator for creating a picture element at a unique, spatially predetermined position along each line of the image. Accordingly, the number of electrode pairs (18a, 19a)–(18i, 19i) determines the number of picture elements that can be printed on each line of the image. By sequentially applying successive sets of data samples to these local modulators while the recording medium 13 is advancing in a cross line direction relative to the light valve 12, successive lines of the image are printed.

Figure 6:
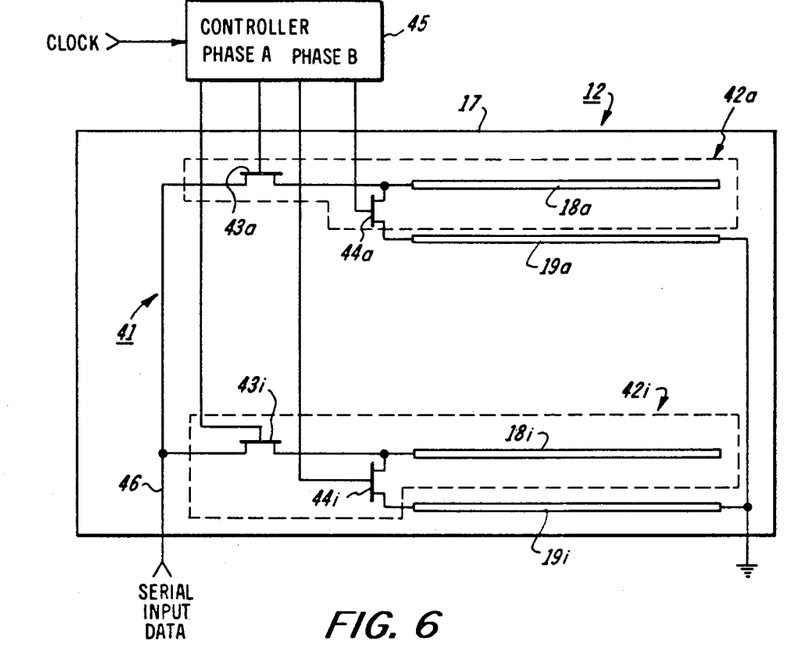
FIG. 6 is a simplified schematic diagram of a multiplexer with sample and hold circuits for applying a serial input data stream to the electro-optic line printer of this invention.

Turning to FIG. 6, image input information is commonly supplied as a serial data stream with a predetermined data rate. For that reason, the line printer 11 has a multiplexer 41 for sequentially and cyclically applying successive input data samples to adjacent electrode pairs (18a, 19a)–(18i, 19i) at a ripple rate which is selected to match the input data rate. As will be appreciated, the input data may be buffered (by means not shown) to permit adjustment of the input data rate. Additionally, the input data may be processed (by means also not shown) upstream of the multiplexer 41 for text editing, formatting or other purposes, provided that the data samples for the ultimate image are applied to the multiplexer 41 in adjacent picture element sequence. See, for example, a commonly assigned U.S. patent application of William Gunning et al., which was filed Apr. 5, 1978 under Ser. No. 893,658 now U.S. Pat. No. 4,302,782.

In accordance with an important feature of the present invention, there are sample and hold circuits 42a–42i for maintaining the data samples for each line of the image on the electrode pairs (18a, 19a)–(18i, 19i) for essentially a full line printing time (i.e., the time alloted to printing a given line of the image). To that end, the multiplexer 41 includes normally disabled series sampling gates 43a–43i, normally disabled shunt reset gates 44a–44i, and a biphase controller 45. The sampling gates 43a–43i are coupled in series between a data input bus 46 and the individually addressable electrodes (18a–18i) and are sequentially and cyclically enabled in response to a first or phase A set of control signals from the controller 45 to apply successive input data samples to adjacent ones of the electrode pairs (18a, 19a)–(18i, 19i). The reset gates 44a–44i, on the other hand, are connected across the paired electrodes (18a, 19a)–(18i, 19i), respectively, and are sequentially and cyclically enabled in response to a second or phase B set of control signals from the controller 45 to sequentially restore the electrode pairs (18a, 19a)–(18i, 19i) to a common or ground potential. The phase B set of control signals is delayed relative to the phase A set by slightly less than a full line printing time so that the data samples are held on the electrodes (18a, 19a)–(18i, 19i) for just under a full line printing time. As will be appreciated, the reset gates 44a–44i and the phase B control signals can be eliminated in favor of allowing the data samples for the successive lines of the image to completely determine the voltage drops across the electrode pairs (18a, 19a-)–(18i, 19i) during each line printing time, provided that the input data samples and the ground plane electrodes (19a–19i) are referenced to substantially the same reference potential.

It has been found that the capacitance provided by the each of the individually addressable electrodes (18a–18i) and the electro-optic element 17 is on the order of 1 picofarad and is sufficient to maintain a substantially constant voltage across that electrode 18a- or 18i and its corresponding ground plane electrode 19a- or 19i for a full line printing time. Thus, no other storage elements are needed to perform the sample and hold function.

Considering the sample and hold circuits 42a–42i in some additional detail, the sampling gates 43a–43i are field effect transistors which have their source/drain circuits coupled in series between the data bus 46 and the individually addressable electrodes (18a–18i), respectively, and their gates coupled to successive ones of the phase A outputs of the controller 45. Similarly, the reset gates 44a–44i are field effect transistors which have their source/drain circuits coupled across the electrode pairs (18a, 19a)–(18i, 19i), respectively, and their gates coupled to successive ones of the phase B outputs of the controller 45. To load the data samples for a line of the image into the sample and hold circuits 42a–42i, the sampling transistors 43a–43i are sequentially switched into conduction at a suitably high ripple rate in response to the phase A control signals provided by the controller 45 so that successive data samples are sequentially applied across adjacent electrode pairs (18a, 19a)–(18i, 19i). Conversely, to reset the sample and hold circuits 42a–42i, the reset transistors 44a–44i are sequentially switched into conduction at the aforesaid ripple rate in response to the time delayed phase B control signals from the controller 45 so that the adjacent electrode pairs (18a, 19a)–(18i, 19i) are successively restored to a grounded state. As used herein, "ground" refers to a reference level potential which may or may not be at zero volts relative to a system ground.

Figure 7:
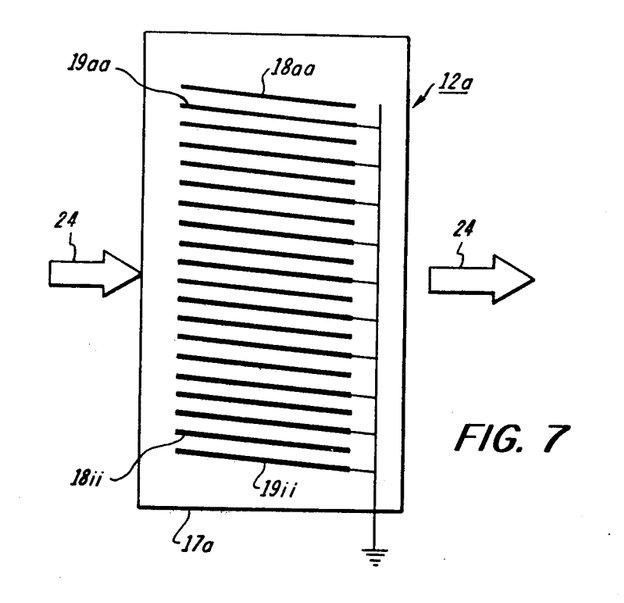
FIG. 7 is a schematic bottom plan view of a Bragg effect light valve which is suitable for use in an electro-optic line printer constructed in accordance with the present invention invention.

As shown in FIG. 7, a Bragg effect light valve 12a may be used in the electro-optic line printer of this invention to reduce the f number required of the imaging optics 31 (FIGS. 1 and 2). As is known, if the electrodes 18aa–18ii and 19aa–19ii are at the so-called Bragg angle relative to the optical axis of the electro-optic element 17a, rather than parallel thereto as in the other illustrated embodiments, the diffraction that occurs will be assymetrical, rather than symmetrical about the zero order. That reduces the f number required of the imaging optics 31 (FIGS. 1 and 2) by a factor of two and may result in increased optical efficiency.

Figure 8:
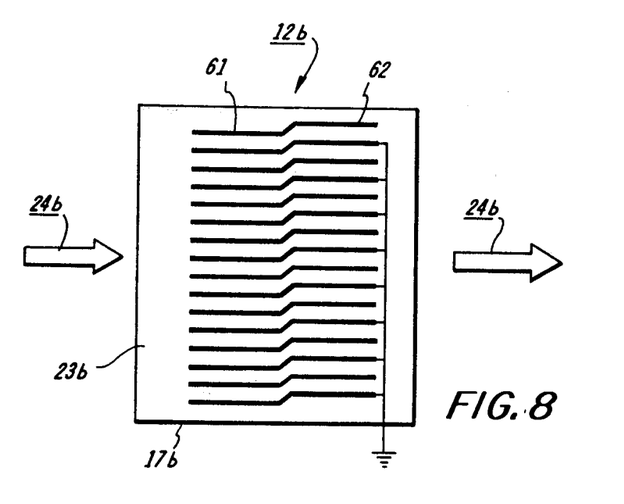
FIG. 8 is a schematic bottom plan view of a TIR light valve having a pair of longitudinally displaced and laterally staggered electrode arrays to avoid aligned blind spots when the light valve is used an electro-optic line printer.

The light valves 12 (FIGS. 1–4) and 12a (FIG. 7) have blind spots because the fringe fields 26 (FIG. 5) terminate on the electrodes and, therefore, have electrode aligned nulls. As shown in FIG. 8, to avoid such blind spots, a light valve 12b having a pair of substantially identical, longitudinally displaced and laterally staggered electrode arrays 61 and 62 may be employed. The arrays 61 and 62 are adjacent the reflecting surface 23b of the electro-optic element 17b and are displaced from one another along its optical axis on opposite sides of the line upon which the light beam 24b is focused. Moreover, the individual electrodes within the arrays 61 and 62 are laterally offset from one another by approximately one half the inter-electrode gap spacing. To ensure that the full phase front of the line beam 24b is modulated, the corresponding electrodes of the two arrays 61 and 62 (i.e., the electrodes in corresponding picture element positions) are electrically interconnected as shown or are simultaneously addressed in parallel.

Figure 9:
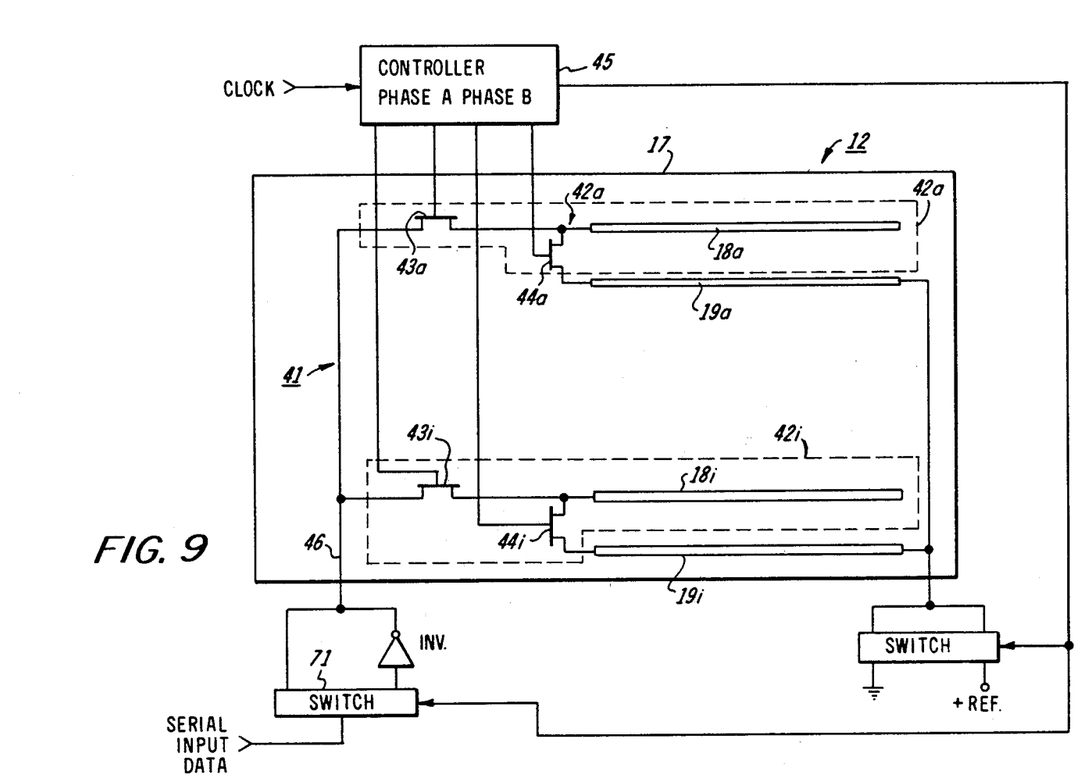
FIG. 9 is a schematic diagram of the multiplexer of FIG. 5 as modified to repeatedly reverse the relative polarity of the data samples applied to the electrodes of the light valve, thereby avoiding an accumulation of trapped carriers that might tend to degrade the performance of the light valve.

Referring to FIG. 9, to avoid optical damage to the electro-optic element 17 (FIGS. 1-5), the polarity of the data samples relative to the ground or reference potential is periodically or aperiodically reversed, thereby preventing an accumulation of trapped carriers in the electro-optic element 17. To accomplish that with digital input data, there suitably is a data inverting switch 71 connected to the input data bus 46 and a refence level control switch 72 connected in the return path for the ground plane or reference electrodes (19a–19i). The data inverting switch 71 and the reference level control switch 72 are synchronously operated in response to a periodic or aperiodic control signal from the controller 45a so that the data samples applied to the individually addressable electrodes (18a–18i) are at times inverted and referenced to a relatively high refence potential and at other times uninverted and referenced to a relatively low reference potential. An accumulation of trapped carriers is avoided by repeatedly reversing the relative polarity of the data samples because changes in the relative polarity of the data samples cause corresponding changes in the polarity of the fringe fields applied to the electro-optic element 17.

CONCLUSION

In view of the foregoing, it will now be appreciated that the present invention provides an electro-optic line printer which is capable of achieving a relatively high exposure. Furthermore, it will be understood that the electro-optic line printer of this invention can be used to print in response to serial data stream. It will also be understood that provision has been made to protect the electro-optic printer of this invention against optical damage and to eliminate optical blind spots.

What is claimed is:

1. In an electro-optic line printer having
a multi-gate light valve for p-modulating a sheet-like, collimated light beam in accordance with input data samples of finite duration representing individual picture elements of an image, and
p-sensitive optics for imaging the modulated light beam onto a photosensitive recording medium which advances in a cross line direction relative to said light valve, whereby said recording medium is exposed in an image configuration;
said light valve including
an optically transmissive electro-optic element having a predetermined optical axis, and
a plurality of individually addressable electrodes intimately coupled to said electro-optic element, said electrodes being spaced apart orthogonally relative to said optical axis;
the improvement comprising
respective sample and hold circuits coupled to said electrodes for maintaining the data samples for each line of said image on said electrodes for period of time longer than the duration of any of said data samples, thereby increasing the exposure of said recording medium;
said sample and hold circuits including capacitive storage means;
said capacitive storage means being defined in substantial part by distributed capacitance between said electrodes and said electro-optic element.

2. The improvement of claim 1 wherein said sample and hold circuits maintain the data samples for each line of said image on said electrodes for nearly a full line printing time.

3. The improvement of claim 1 wherein said electrodes are at a Bragg angle relative to the optical axis of said electro-optic element.

4. The improvement of claim 3 wherein
said sample and hold circuits maintain the data samples for each line of said image on said electrodes for approximately a full line printing time, and
said capacitance substantially solely defines the storage means of said sample and hold circuits.

5. The improvement of claim 1 wherein
said electro-optic element has a reflecting surface,
said light beam is applied to said electro-optic element at a grazing angle of incidence relative to said reflecting surface and is brought to a wedge shaped focus on said surface to be totally internally reflected therefrom,
said individually addressable electrodes are intimately coupled to said electro-optic element adjacent said reflecting surface for creating electric fringe fields within said electro-optic element to phase front modulate said light beam, and
said p-sensitive optics are Schleiren optics.

6. The improvement of claim 5 wherein said electro-optic element is a crystal having a polished input face, a polished output face, and a polished reflecting surface between said input face and said output face.

7. The improvement of claim 5 wherein
said individually addressable electrodes are paired with respective ground plane electrodes, and
said ground plane electrodes are intimately coupled to said electro-optic element adjacent said reflecting surface and are distributed across said electro-optic element in alternating paired relationship with said individually addressable electrodes.

8. The improvement of claim 7 wherein said individually addressable electrodes and said ground plane electrodes are at a Bragg angle relative to the optical axis of said electro-optic element.

9. The improvement of claim 7 further including means for repeatedly reversing the polarity of said data samples relative to said ground plane electrodes.

10. The improvement of claim 1 further including
a serial data bus for supplying said input data samples in adjacent picture element sequence and at a predetermined data rate,
respective sampling gates for said sample and hold circuits, said sampling gates being coupled between said data bus and respective ones of said individually addressable electrodes, and
a controller coupled to said sampling gates for sequentially and cyclically enabling said sampling gates at a ripple rate selected to match said data rate, whereby data samples for adjacent picture elements are rippled onto adjacent ones of said individually addressable electrodes.

11. The improvement of claim 10 wherein
said sample and hold circuits further include respective reset gates, said reset gates being coupled between respective ones of said individually addressed electrodes and a ground plane, and
said controller is coupled to said reset gates for sequentially and cyclically enabling said reset gates at said ripple rate with a phase delay relative to the enabling of said sampling gates, thereby causing said data samples to be held on said electrodes for said extended period of time.

12. The improvement of claim 11 wherein said phase delay is selected to cause said data samples to be held on said electrodes for substantially a full line printing time.

13. The improvement of claim 10 wherein the storage elements of said sample and hold circuits are substantially solely defined by said capacitance.

14. The improvement of claim 10 wherein
said electro-optic element has a reflecting surface,
said light beam is applied to said electro-optic element at a grazing angle of incidence relative to said reflecting surface and is brought to a wedge shaped focus on said surface to be totally internally reflected therefrom,
said individually addressable electrodes are intimately coupled to said electro-optic element adjacent said reflecting surface for creating electric fringe fields within an interaction region of said electro-optic element proximate said reflecting surface, whereby the phase front of said light beam is modulated in accordance with the data samples applied to said electrodes as said light beam passes through said interaction region, and
said p-sensitive optics are Schleiren optics.

15. The improvement of claim 14 wherein said electrodes are at a Bragg angle relative to the optical axis of said electro-optic element.

16. The improvement of claim 14 further including
a plurality of ground plane electrodes, said ground plane electrodes being intimately coupled to said electro-optic element adjacent said reflecting surface and being distributed across said electro-optic element in alternating paired relationship with said individually addressable electrodes; and
a plurality of reset gates coupled between respective ones of said individually addressable electrodes and said ground plane electrodes to reset said sample and hold circuits once per line scanning time in response to control signals from said controller.

17. The improvement of claim 1 wherein
said light valve has first and second sets of electrodes longitudinally displaced from one another along said optical axis,
the electrodes of said first and second sets being intimately coupled to said electro-optic element and being distributed thereacross in laterally staggered relationship for spatially modulating said light beam.

18. The improvement of claim 17 wherein
said first and second sets of electrodes create electric fringe fields in said electro-optic element in response to said data samples, thereby modulating the phase front of said light beam in response to said data samples,
said data samples are simultaneously applied to corresponding electrodes of said first and second sets, whereby all parts of the phase front of said light beam are modulated in accordance with said data samples, despite any electrode aligned nulls in said fringe fields, and
said p-sensitive optics are Schleiren optics.

19. The improvement of claim 18 wherein
said electro-optic element has a reflecting surface,
said first and second sets of electrodes are intimately coupled to said electro-optic element adjacent said reflecting surface to create said fringe fields in an interaction region proximate said reflecting surface, and
said light beam is applied to said electro-optic element at a grazing angle of incidence relative to said reflecting surface and is brought to a wedge shaped focus on said reflecting surface along a line approximately midway between said first and second sets of said electrodes, whereby said light beam interacts with the fringe fields created by said first set of electrodes while approaching said reflecting surface and with the fringe fields created by said second set of electrodes after being totally internally reflected from said reflecting surface.

20. The improvement of claim 19 wherein the corresponding electrodes of said first and second sets are electrically interconnected to receive said data samples simultaneously.

* * * * *